(12) United States Patent
Morita

(10) Patent No.: US 12,723,527 B2
(45) Date of Patent: Sep. 1, 2026

(54) OIL CONDITION ESTIMATION DEVICE AND OIL CONDITION ESTIMATION METHOD

(71) Applicant: ISUZU MOTORS LIMITED, Yokohama (JP)

(72) Inventor: Shinichi Morita, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/196,282

(22) Filed: May 1, 2025

(65) Prior Publication Data

US 2025/0389214 A1 Dec. 25, 2025

(30) Foreign Application Priority Data

Jun. 21, 2024 (JP) ................................ 2024-100104

(51) Int. Cl.
*F01M 11/10* (2006.01)
*F16N 29/04* (2006.01)

(52) U.S. Cl.
CPC ............ *F01M 11/10* (2013.01); *F16N 29/04* (2013.01); *F01M 2011/1446* (2013.01); *F01M 2011/1453* (2013.01); *F16N 2250/04* (2013.01); *F16N 2250/18* (2013.01)

(58) Field of Classification Search
CPC .......... F01M 11/10; F01M 2011/1446; F01M 2011/1453; F01M 11/12; F16N 29/04; F16N 2250/04; F16N 2250/18
See application file for complete search history.

(56) References Cited

U.S. PATENT DOCUMENTS

| | | | | |
|---|---|---|---|---|
| 4,311,041 A * | 1/1982 | Reid | F01M 11/10 73/114.57 |
| 6,880,528 B2 * | 4/2005 | Klugl | F02M 63/0225 123/468 |
| 6,917,865 B2 * | 7/2005 | Arai | F01M 11/10 701/29.5 |
| 6,975,216 B2 * | 12/2005 | Tharman | F01M 11/12 73/304 R |
| 7,201,051 B2 * | 4/2007 | Wang | F01M 1/18 324/698 |
| 8,127,597 B2 * | 3/2012 | Staley | G01N 11/00 123/196 R |
| 8,783,214 B2 * | 7/2014 | Sachdev | F01M 11/12 123/304 |
| 9,020,766 B2 * | 4/2015 | Von Herzen | G01M 15/05 702/50 |

(Continued)

FOREIGN PATENT DOCUMENTS

| | | |
|---|---|---|
| CN | 216381549 U | 4/2022 |
| DE | 112016003599 T5 | 5/2018 |
| JP | H09-127067 A | 5/1997 |

*Primary Examiner* — Henry Y Liu
(74) *Attorney, Agent, or Firm* — PROCOPIO, CORY, HARGREAVES & SAVITCH LLP

(57) ABSTRACT

An oil condition estimation device includes a first acquisition unit that acquires a pressure of oil stored in an oil pan from a pressure sensor provided on a bottom surface of the oil pan of an internal combustion engine, a second acquisition unit that acquires a distance between the bottom surface and a liquid level of oil from a level sensor provided in the oil pan, and a calculation unit that calculates a density of oil on the basis of the pressure and the distance.

14 Claims, 3 Drawing Sheets

(56) References Cited

U.S. PATENT DOCUMENTS

| | | | | |
|---|---|---|---|---|
| 9,389,215 | B2 * | 7/2016 | Von Herzen | G01N 33/2888 |
| 9,473,831 | B2 * | 10/2016 | Von Herzen | H04Q 9/00 |
| 9,651,538 | B2 * | 5/2017 | Von Herzen | G01N 33/28 |
| 9,982,580 | B2 * | 5/2018 | Staley | F01M 11/0408 |
| 2003/0041659 | A1 * | 3/2003 | Marszalek | G01N 33/2888 73/114.57 |
| 2004/0035398 | A1 * | 2/2004 | Klugl | F02M 61/14 123/456 |
| 2004/0040789 | A1 * | 3/2004 | Rake | F16N 39/005 184/6.24 |
| 2004/0093150 | A1 * | 5/2004 | Arai | F01M 11/10 701/104 |
| 2004/0246118 | A1 * | 12/2004 | Tharman | F01M 11/12 340/450 |
| 2006/0107734 | A1 * | 5/2006 | Wang | F01M 1/18 73/114.38 |
| 2009/0188755 | A1 * | 7/2009 | Staley | G01N 11/00 123/196 R |
| 2009/0234533 | A1 * | 9/2009 | Trinkner | F01M 11/10 702/55 |
| 2011/0041796 | A1 * | 2/2011 | Sachdev | B01D 35/143 123/196 A |
| 2014/0130587 | A1 * | 5/2014 | Von Herzen | G01N 33/2888 73/114.55 |
| 2015/0082872 | A1 * | 3/2015 | Von Herzen | F16N 29/00 73/53.05 |
| 2015/0163568 | A1 * | 6/2015 | Von Herzen | G01N 27/02 340/870.07 |
| 2016/0290191 | A1 * | 10/2016 | Staley | F01M 11/12 |
| 2016/0363575 | A1 * | 12/2016 | Von Herzen | G01N 33/2888 |
| 2017/0074853 | A1 * | 3/2017 | Von Herzen | G01M 15/042 |
| 2017/0284068 | A1 * | 10/2017 | Nakamura | G01N 33/30 |
| 2020/0378283 | A1 * | 12/2020 | Zhang | G01N 33/2888 |

* cited by examiner

OIL CONDITION ESTIMATION DEVICE AND OIL CONDITION ESTIMATION METHOD

CROSS-REFERENCE TO RELATED APPLICATIONS

The present application claims priority to Japanese Patent Application number 2024-100104, filed on Jun. 21, 2024, contents of which are incorporated herein by reference in its entirety.

BACKGROUND OF THE INVENTION

The present disclosure relates to an oil condition estimation device and an oil condition estimation method. A conventional oil tester determines that oil has deteriorated when the propagation rate of ultrasonic waves transmitted through the oil injected into an oil tank for measurement is low (for example, Japanese Unexamined Patent Application Publication No. H9-127067).

When a density of oil is measured by the conventional oil tester, it is necessary to transfer oil from equipment such as an engine to the oil tank for measurement before measuring the propagation rate of ultrasonic waves, which increases the effort required for measurement. Furthermore, since the transducer for generating ultrasonic waves is expensive, the cost of such measurements increases.

BRIEF SUMMARY OF THE INVENTION

The present disclosure has been made in view of these points, and its object is to estimate a density of oil in a simple and cost-effective manner.

An oil condition estimation device according to a first aspect of the present disclosure includes: a first acquisition unit that acquires a pressure of oil stored in an oil pan from a pressure sensor provided on a bottom surface of the oil pan of an internal combustion engine; a second acquisition unit that acquires a distance between the bottom surface and a liquid level of the oil, from a level sensor provided in the oil pan; and a calculation unit that calculates a density of the oil on the basis of the pressure and the distance.

An oil condition estimation method according to a second aspect of the present disclosure includes: a first acquiring step of acquiring a pressure of oil stored in an oil pan from a pressure sensor provided on a bottom surface of the oil pan of the internal combustion engine; a second acquiring step of acquiring a distance between the bottom surface and a liquid level of the oil, from a level sensor provided in the oil pan; and a calculating step of calculating a density of the oil on the basis of the pressure and the distance.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Overview of an Oil Condition Estimation System S>

Figure 1:
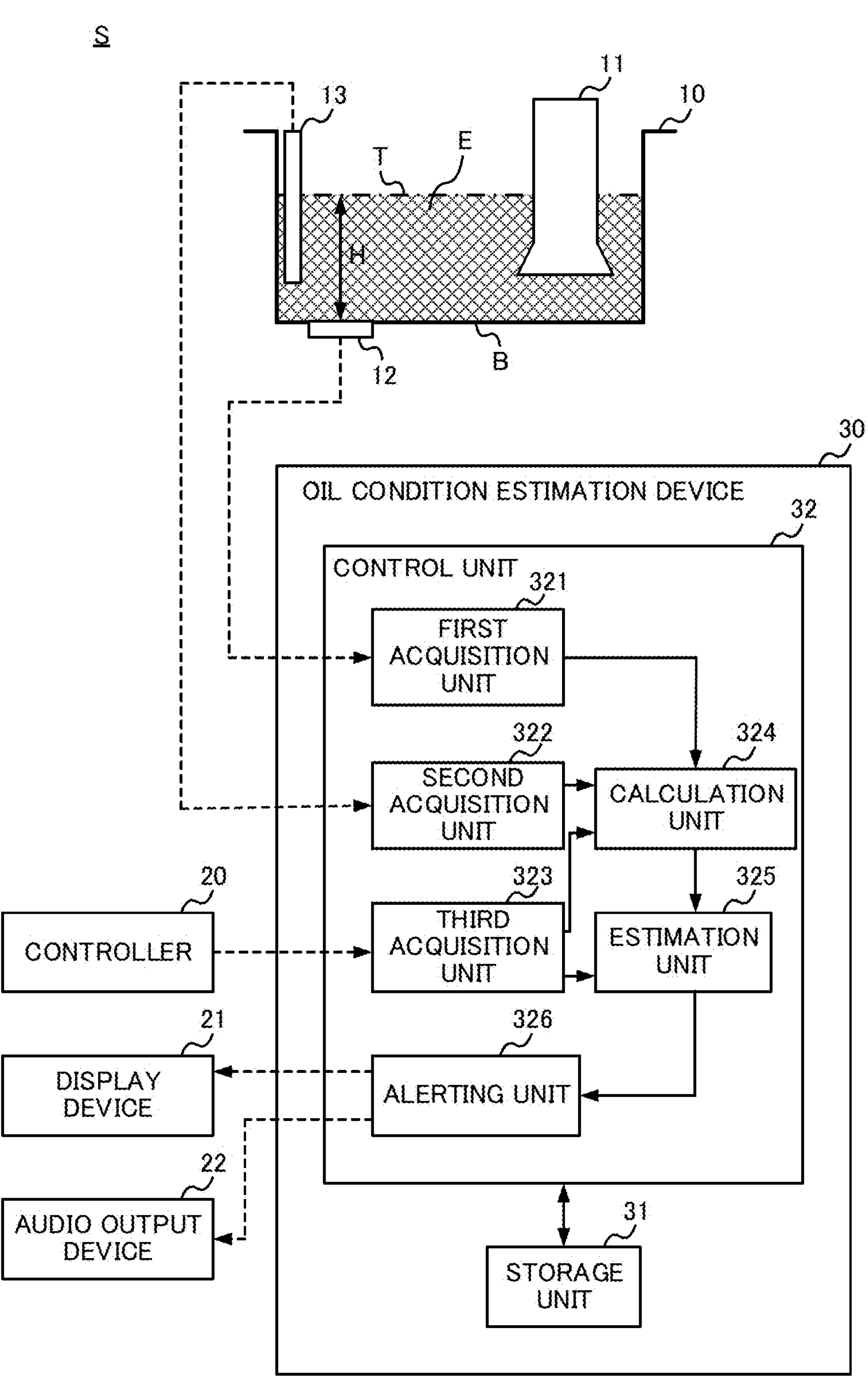
FIG. 1 shows an overview of an oil condition estimation system S according to the present embodiment.

FIG. 1 shows an overview of an oil condition estimation system S according to the present embodiment. The oil condition estimation system S illustrated in FIG. 1 includes an oil pan 10, a strainer 11, a pressure sensor 12, a level sensor 13, a controller 20, a display device 21, an audio output device 22, and an oil condition estimation device 30. The oil condition estimation system S has functions of estimating whether or not the condition of oil E in an internal combustion engine is abnormal on the basis of the density ρ of oil E, and providing notification to a user of the internal combustion engine when the condition of oil E is estimated to be abnormal. The abnormality in the condition of oil E is, for example, deterioration of oil E or dilution of oil E by fuel. The user is, for example, a driver of a moving body when the internal combustion engine is mounted on the moving body such as a vehicle.

The oil pan 10 is a tank that is provided in a lower portion of the internal combustion engine and stores oil E, which circulates within the internal combustion engine. The strainer 11 is provided at the distal end of a suction port of an oil pump (not shown) that draws in oil E stored in the oil pan 10 and supplies oil E to the internal combustion engine. The strainer 11 functions as a filter for filtering oil E. The pressure sensor 12 is a sensor that is provided on a bottom surface B of the oil pan 10 and detects a pressure of oil E stored in the oil pan 10. The level sensor 13 is a sensor that is provided in the oil pan 10 and detects a distance H between the bottom surface B of the oil pan 10 and the liquid level T of oil E.

The controller 20 is a device including a processor such as a central processing unit (CPU) or an electronic control unit (ECU), and controls the operation of the internal combustion engine. For example, the controller 20 initiates or stops the internal combustion engine in response to an operation performed by a user. The display device 21 is, for example, a display. The audio output device 22 is a speaker.

The oil condition estimation device 30 calculates the density ρ of oil E on the basis of a pressure P of oil E detected by the pressure sensor 12 and the distance H detected by the level sensor 13. By operating in this manner, the oil condition estimation device 30 can easily calculate the density ρ without transferring oil E to a container outside the oil pan 10. Furthermore, since the oil condition estimation device 30 calculates the density ρ without using ultrasonic waves generated by a transducer, the density ρ can be calculated in a more cost-effective manner. The oil condition estimation device 30 estimates whether or not the condition of oil E is abnormal on the basis of the calculated density ρ, and notifies the user when it is estimated that oil E is abnormal.

<Configuration of the Oil Condition Estimation Device 30>

As illustrated in FIG. 1, the oil condition estimation device 30 includes a storage unit 31 and a control unit 32. The control unit 32 includes a first acquisition unit 321, a second acquisition unit 322, a third acquisition unit 323, a calculation unit 324, an estimation unit 325, and a notification unit 326.

The storage unit 31 includes, for example, a storage medium such as a read only memory (ROM), a random access memory (RAM), a hard disk drive (HDD), or a solid state drive (SSD). The storage unit 31 stores programs executed by the control unit 32 and various types of information for the oil condition estimation device 30 to estimate the condition of oil E.

The control unit 32 is a processor such as a CPU or an ECU. The control unit 32 functions as the first acquisition unit 321, the second acquisition unit 322, the third acquisition unit 323, the calculation unit 324, the estimation unit 325, and the notification unit 326 by executing the programs stored in the storage unit 31. It should be noted that the control unit 32 may be configured by a single processor, or may be configured by a plurality of processors or a combination of one or more processors and an electronic circuit.

The first acquisition unit 321 acquires the pressure P of oil E stored in the oil pan 10 from the pressure sensor 12, which is provided on the bottom surface B of the oil pan 10 of the internal combustion engine. The second acquisition unit 322 acquires the distance H (position of the liquid level T) between the bottom surface B and the liquid level T of oil E, from the level sensor 13, which is provided in the oil pan 10.

The third acquisition unit 323 acquires various types of information from the controller 20. For example, the third acquisition unit 323 acquires replacement information from the controller 20, indicating that oil E has been replaced with new oil E. By acquiring the replacement information, the calculation unit 324 can calculate the density ρ of oil E immediately after being replaced with new oil E. When the internal combustion engine is mounted on a moving body, such as a vehicle, the third acquisition unit 323 may acquire distance information indicating the travel distance of the moving body or time information indicating the travel time of the moving body, instead of the replacement information. By acquiring the distance information or time information, the calculation unit 324 can estimate the timing at which oil E was replaced with new oil E, on the basis of the travel distance or travel time of the moving body, and calculate the density ρ at the timing.

For example, the third acquisition unit 323 acquires, from the controller 20, timing information indicating (i) a start timing at which the internal combustion engine is started or (ii) a stop timing at which the internal combustion engine is stopped. The start timing is, for example, a timing at which the operation of starting the internal combustion engine is received from the user of the internal combustion engine. The stop timing is, for example, a timing immediately after the piston stops. By acquiring the timing information, the calculation unit 324 can calculate the density ρ at an appropriate timing.

The calculation unit 324 calculates the density ρ of oil E on the basis of the pressure P acquired by the first acquisition unit 321 and the distance H acquired by the second acquisition unit 322. The density ρ can be expressed by Equation 1 using the pressure P and the distance H. The constant g represents gravitational acceleration (9.80665 m/s$^2$).

$$\rho = \frac{P}{gH} \tag{1}$$

By operating in this manner, the calculation unit 324 can calculate the density ρ of oil E without transferring oil E from the oil pan 10 to the external container. Furthermore, the calculation unit 324 can calculate the density ρ without using an oil sensor equipped with a vibrator.

The calculation unit 324 calculates a first density (hereinafter, referred to as "density ρ1") of oil E by detecting replacement of oil E stored in the oil pan 10. For example, the calculation unit 324 detects the replacement of oil E by the third acquisition unit 323 acquiring the replacement information and calculates the density ρ1. The calculation unit 324 may calculate the density ρ1 when the difference between (i) a travel distance included in the distance information acquired by the third acquisition unit at the present time and (ii) a travel distance included in the distance information acquired at a time when the density ρ1 was calculated before the present time is equal to or greater than a predetermined distance. The calculation unit 324 may calculate the density ρ1 when the difference between (i) a travel time included in the time information acquired by the third acquisition unit at the present time and (ii) a travel time included in the time information acquired at a time when the density ρ1 was calculated before the present time is equal to or greater than a predetermined time.

The calculation unit 324 calculates a second density (hereinafter, referred to as "density ρ2") of oil E at a predetermined first cycle from the timing at which the density ρ1 was calculated. The predetermined first cycle is, for example, one day. The calculation unit 324 may calculate, as the density ρ2, a statistical quantity of a plurality of densities ρ2 calculated for each first cycle in a second cycle which is longer than the predetermined first cycle. When the first cycle is one day, the second cycle is, for example, one week. The statistical quantity is, for example, an average value or a median value. By operating in this manner, the calculation unit 324 can use the statistical value based on the plurality of densities ρ2 calculated at a plurality of timings as the density ρ2. Therefore, it is possible to improve the accuracy of calculating the density ρ2.

When the internal combustion engine is mounted on a moving body such as a vehicle, if the moving body is traveling on a rough road or suddenly accelerates or decelerates, the height of the liquid level T of oil E (the distance H between the bottom surface B and the liquid level T) or the inclination of the liquid level T changes, and therefore the accuracy of calculating the density ρ of oil E may decrease. Therefore, the calculation unit 324 may calculate at least one of the density ρ1 or the density ρ2 within a time period from the timing at which the operation of starting the internal combustion engine is received until a timing immediately before the internal combustion engine starts.

For example, upon the third acquisition unit 323 acquiring the timing information indicating the start timing, the calculation unit 324 causes the first acquisition unit 321 to acquire the pressure P of oil E and causes the second acquisition unit 322 to acquire the distance H. Then, the calculation unit 324 calculates the density ρ of oil E on the basis of the acquired pressure P and distance H. Since the internal combustion engine is started using a cell motor after receiving the operation of starting, the calculation unit 324 can calculate the density ρ while the cell motor is in operation (that is, before the internal combustion engine starts) by operating as described above. As a result, because the calculation unit 324 can calculate the density ρ before the moving body moves, it is possible to improve the accuracy of calculating the density ρ.

The calculation unit 324 may calculate not only the density ρ of oil E but also the weight W of oil E stored in the oil pan 10. The calculation unit 324 calculates the weight W of oil E on the basis of, for example, the pressure P of oil E and a cross-sectional area A of the oil pan 10 corresponding to the position of the liquid level T of oil E. The cross-sectional area A is stored in the storage unit 31. The weight W can be expressed by Equation 2 using the distance H, the cross-sectional area A, and the density $\rho$. Then, the weight W can be expressed by Equation 3 using Equations 1 and 2.

$$W = \rho HA \tag{2}$$

$$W = \frac{PA}{g} \tag{3}$$

By operating in this manner, the calculation unit 324 enables the estimation unit 325 to estimate the state of the internal combustion engine (for example, the presence or absence of a malfunction) on the basis of the weight W.

While the internal combustion engine is operating, oil E circulates within the internal combustion engine. As a result, the weight W of oil E stored in the oil pan 10 is less than the weight W of oil E while the internal combustion engine is stopped. Furthermore, since part of oil E adheres to various parts of the internal combustion engine immediately after the internal combustion engine is stopped, the weight W cannot be accurately calculated. Therefore, the calculation unit 324 may calculate the weight W of oil E within a time period from a timing at which the predetermined time has elapsed after the internal combustion engine stops until a timing immediately before the internal combustion engine starts. The predetermined time is, for example, 3 hours.

For example, the calculation unit 324 detects that the predetermined time has elapsed from the timing at which the third acquisition unit 323 acquires the timing information indicating the stop timing and that the third acquisition unit 323 has not acquired the timing information indicating the start timing. The calculation unit 324 causes the first acquisition unit 321 to acquire the pressure P at the timing of this detection and calculates the weight W using the pressure P. By operating as described above, the calculation unit 324 can improve accuracy of calculating the weight W of oil E.

The cross-sectional area A of the oil pan 10 may vary depending on the distance from the bottom surface B. Therefore, the calculation unit 324 may identify the cross-sectional area A corresponding to the distance H detected by the second acquisition unit 322 and calculate the weight W on the basis of the identified cross-sectional area A and the pressure P. For example, the calculation unit 324 identifies the cross-sectional area A corresponding to the distance H by referencing a cross-sectional area table stored in the storage unit 31, and then calculates the weight W. The cross-sectional area A included in the cross-sectional area table stored in the storage unit 31 is, for example, a quotient obtained by dividing the volume of the oil pan 10 corresponding to each distance in the height direction from the bottom surface B by that distance. By operating as described above, the calculation unit 324 can calculate the weight W of oil E with high accuracy, regardless of the shape of the oil pan 10.

When the density difference, which represents a difference between the density $\rho$1 calculated by the calculation unit 324 at a first time and the density $\rho$2 calculated by the calculation unit 324 at a second time after the first time, is equal to or greater than a first threshold value, the estimation unit 325 estimates that the condition of oil E is abnormal. The first time is a timing at which the replacement of oil E stored in the oil pan 10 is detected, and the second time is a time occurring at each predetermined cycle after the timing at which the density $\rho$1 was calculated. The first threshold value may be a fixed value stored in the storage unit 31 or a predetermined ratio (for example, 10%) of the density $\rho$1.

For example, in a case where the density difference is equal to or greater than the first threshold value and the density $\rho$1 is less than the density $\rho$2, the estimation unit 325 estimates that a substance included in oil E has volatilized or that oil E has deteriorated due to its oxidation. For example, in a case where the density difference is equal to or greater than the first threshold value and the density $\rho$1 is greater than the density $\rho$2, the estimation unit 325 estimates that oil E has been diluted by the fuel injected into the internal combustion engine. By operating as described above, the estimation unit 325 can estimate the type of abnormality in the condition of oil E.

The greater the distance the moving body equipped with the internal combustion engine travels after the replacement of oil E stored in the oil pan 10, the more the estimation unit 325 may reduce the first threshold value. The more time elapses from the timing at which oil E stored in the oil pan 10 was replaced, the more the estimation unit 325 may reduce the first threshold value. By operating in this manner, the estimation unit 325 can more easily estimate that the condition of oil E is abnormal as the distance or elapsed time from the detection of oil E's replacement increases, thereby making it easier to prompt the driver to replace oil E.

The estimation unit 325 may estimate that a malfunction has occurred in the internal combustion engine when the subtraction value obtained by subtracting a second weight of oil E, calculated by the calculation unit 324 at the second time that is later than the first time, from a first weight of oil E, calculated by the calculation unit 324 at the first time, is equal to or greater than a second threshold value. The second threshold value may be a fixed value stored in the storage unit 31 or may be a predetermined ratio (for example, 10%) of the first weight. By operating in this manner, the estimation unit 325 can estimate whether oil E is being consumed due to a malfunction of the internal combustion engine. In the following description, the first weight is referred to as "weight W1", and the second weight is referred to as "weight W2".

By causing the display device 21 to display a warning image corresponding to an estimation result estimated by the estimation unit 325 or by causing the audio output device 22 to output a warning sound corresponding to the estimation result, the notification unit 326 notifies the driver of the estimation result. For example, the notification unit 326 notifies the user of the internal combustion engine that the estimation unit 325 has estimated that the condition of oil E is abnormal due to the density difference being equal to or greater than the first threshold value. The notification unit 326 may cause the display device 21 to display a first warning image when the estimation unit 325 estimates that oil E has deteriorated and may cause the display device to display a second warning image when the estimation unit 325 estimates that oil E has been diluted.

The notification unit 326 notifies the user of the internal combustion engine that the estimation unit 325 has estimated that a malfunction has occurred in the internal combustion engine on the basis of, for example, the weight of oil E. In this case, the notification unit 326 causes the display device 21 to display, for example, a third warning image corresponding to the malfunction of the internal combustion engine. By having the notification unit 326 operate in this way, the user of the internal combustion engine can easily recognize the condition of oil E and the state of the internal combustion engine.

<Processing Sequence in the Oil Condition Estimation Device 30>

Figure 2:
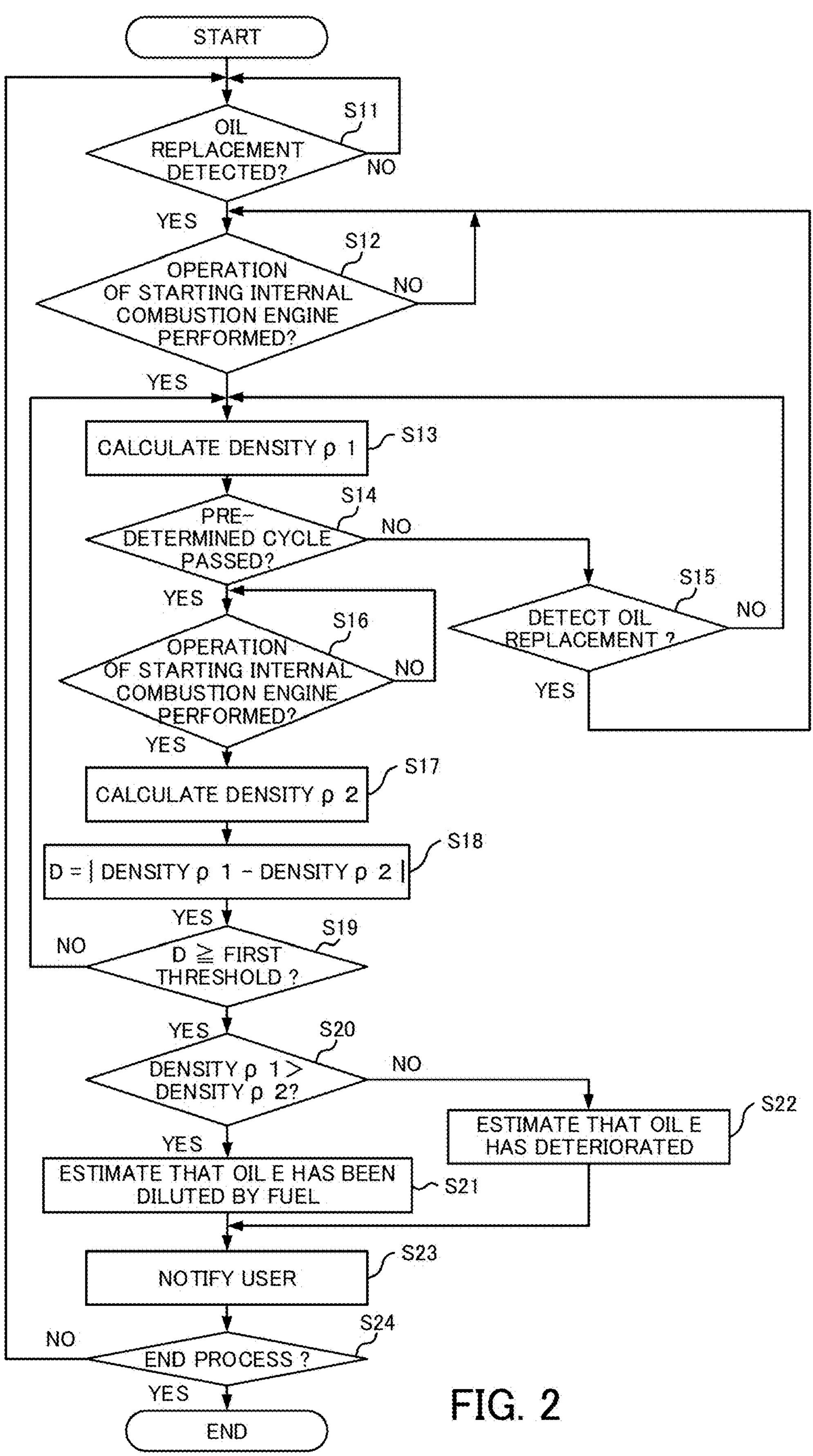
FIG. 2 shows the operation of estimating an abnormality in the condition of oil E.
Figure 3:
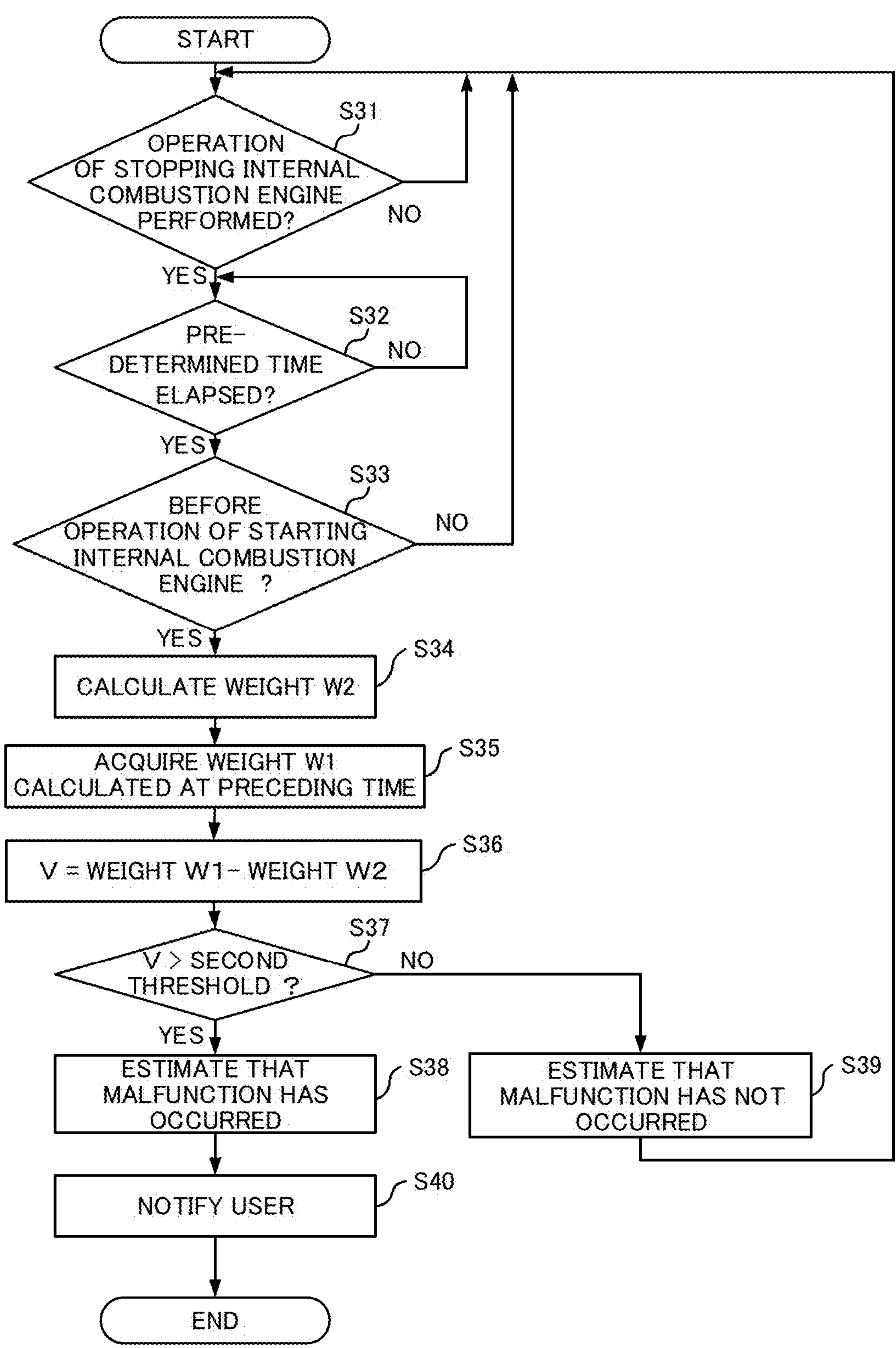
FIG. 3 shows the operation of estimating a malfunction of an internal combustion engine.

FIGS. 2 and 3 are each a diagram illustrating an example of a processing sequence in the oil condition estimation device 30. FIG. 2 shows the operation of estimating an abnormality in the condition of oil E, and FIG. 3 shows the operation of estimating a malfunction of the internal combustion engine.

First, the operation of estimating an abnormality in the condition of oil E will be described. As illustrated in FIG. 2, the calculation unit 324 detects whether oil E has been replaced on the basis of whether or not the third acquisition unit 323 has acquired the replacement information (S11). If oil replacement is not detected (NO in S11), the calculation unit 324 repeats the process of step S11. If oil replacement is detected (YES in S11), the calculation unit 324 determines whether or not the user of the internal combustion engine has performed the operation of starting the internal combustion engine, on the basis of the timing information acquired by the third acquisition unit 323 (S12).

If the third acquisition unit 323 has not acquired the timing information indicating the start timing (NO in S12), in other words, in a case where it is determined that the user of the internal combustion engine has not performed the operation of starting the internal combustion engine, the calculation unit 324 repeats the process of step S12. If the third acquisition unit 323 has acquired the timing information (YES in S12), in other words, in a case where it is determined that the user of the internal combustion engine has performed the operation of starting the internal combustion engine, the calculation unit 324 calculates the density ρ1 (S13). If the predetermined cycle has not elapsed after the density ρ1 was calculated (NO in S14), the calculation unit 324 detects whether or not oil E has been replaced again (S15). If oil replacement is detected (YES in S15), the calculation unit 324 returns to the process of step S12, and if oil replacement is not detected (NO in S15), the calculation unit 324 returns to the process of step S14.

If the predetermined cycle has elapsed after the density ρ1 was calculated (YES in S14), the calculation unit 324 determines whether the user has performed the operation of starting the internal combustion engine (S16). If the third acquisition unit 323 has not acquired the timing information indicating the start timing (NO in S16), in other words, in a case where it is determined that the user of the internal combustion engine has not performed the operation of starting the internal combustion engine, the calculation unit 324 repeats the process of step S16. If the third acquisition unit 323 acquires the timing information (YES in S16), in other words, in a case where it is determined that the user of the internal combustion engine has performed the operation of starting the internal combustion engine, the calculation unit 324 calculates the density ρ2 (S17) and the estimation unit 325 calculates the absolute value D of the difference between the density ρ1 and the density ρ2 (S18).

If the absolute value D is less than the first threshold value (NO in S19), the calculation unit 324 returns to the process of step S14. If the absolute value is equal to or greater than the first threshold value (YES in S19) and the density ρ1 is greater than the density ρ2 (YES in S20), the estimation unit 325 estimates that oil E has been diluted by fuel (S21). Then, the notification unit 326 notifies the user that the estimation unit 325 has estimated that oil E has been diluted by fuel (S23).

If the absolute value is equal to or greater than the first threshold value (YES in S19) and the density ρ1 is less than the density ρ2 (NO in S20), the estimation unit 325 estimates that oil E has deteriorated (S22). Then, the notification unit 326 notifies the user that the estimation unit 325 has estimated that oil E has deteriorated (S23). If the instruction to stop the process is not received (NO in S24), the oil condition estimation device 30 returns to the process of step S11. If an instruction to stop the process is received (YES in S24), the oil condition estimation device 30 ends the process.

Next, the operation of estimating the malfunction of the internal combustion engine will be described. As illustrated in FIG. 3, the calculation unit 324 determines whether or not the user has performed the operation of stopping the internal combustion engine on the basis of the timing information acquired by the third acquisition unit 323 (S31). If the third acquisition unit 323 has not acquired the timing information indicating the stop timing (NO in S31), in other words, in a case where it is determined that the user of the internal combustion engine has not performed the operation of starting the internal combustion engine, the calculation unit 324 repeats the process of S31. If the third acquisition unit 323 has acquired the timing information (YES in S31), in other words, in a case where it is determined that the user of the internal combustion engine has performed the operation of starting the internal combustion engine, the calculation unit 324 determines whether or not the predetermined time has elapsed (S32).

If the predetermined time has not elapsed (NO in S32), the calculation unit 324 repeats the process of step S32. If the predetermined time has elapsed (YES in S32), the calculation unit 324 determines whether the present time is before or after the timing at which the operation of starting the internal combustion engine was performed, on the basis of the timing information acquired by the third acquisition unit 323 (S33). If the third acquisition unit 323 acquires the timing information indicating the start timing, the calculation unit 324 determines that the present time is after the timing at which the operation of starting the internal combustion engine was performed (NO in S33), and returns to the process of step S31. If the third acquisition unit 323 has not acquired the timing information, the calculation unit 324 determines that the present time is before the timing at which the operation of starting the internal combustion engine will be performed (YES in S33), and calculates the weight W2 of oil E (S34).

The estimation unit 325 acquires the weight W1 of oil E calculated by the calculation unit 324 at the preceding time (for example, the time when the calculation unit 324 detects oil replacement) by referencing the storage unit 31 (S35), and calculates the subtraction value V obtained by subtracting the weight W2 from the weight W1 (S36). If the subtraction value V is less than the second threshold value (NO in S37), the estimation unit 325 estimates that a malfunction has not occurred in the internal combustion engine (S39), and returns to the process of step S31. If the subtraction value V is equal to or greater than the second threshold value (YES in S37), the estimation unit 325 estimates that a malfunction has occurred in the internal combustion engine (S38). Then, the notification unit 326 notifies the user that a malfunction has occurred in the internal combustion engine (S40).

<Effects of the Oil Condition Estimation Device 30>

As described above, the oil condition estimation device 30 includes the first acquisition unit 321 that acquires the pressure P of oil E stored in the oil pan 10 from the pressure sensor 12, which is provided on the bottom surface B of the oil pan 10 of the internal combustion engine, the second acquisition unit 322 that acquires the distance H between the bottom surface B and the liquid level T of oil E from the level sensor 13, which is provided in the oil pan 10, and the calculation unit 324 that calculates the density ρ of oil E on the basis of the pressure P and the distance H.

Since the oil condition estimation device 30 is configured in this manner, the oil condition estimation device 30 can estimate the density of oil E with high accuracy without transferring oil E from the oil pan 10 to the external container. Furthermore, the oil condition estimation device 30 can estimate the density of oil E with high accuracy without using an oil sensor equipped with a vibrator. As a result, the oil condition estimation device 30 can estimate the density of oil E in a simple and cost-effective manner with high accuracy.

The present disclosure is explained based on the exemplary embodiments. The technical scope of the present disclosure is not limited to the scope explained in the above embodiments and it is possible to make various changes and modifications within the scope of the disclosure. For example, all or part of the device can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An oil condition estimation device comprising:
- a first acquisition unit that acquires a pressure of oil stored in an oil pan from a pressure sensor provided on a bottom surface of the oil pan of an internal combustion engine;
- a second acquisition unit that acquires a distance between the bottom surface and a liquid level of the oil, from a level sensor provided in the oil pan; and
- a calculation unit that calculates a density of the oil on the basis of the pressure and the distance.

2. The oil condition estimation device according to claim 1, further comprising:
- an estimation unit that estimates that a condition of the oil is abnormal when a density difference which represents a difference between a first density calculated by the calculation unit at a first time and a second density calculated by the calculation unit at a second time after the first time, is equal to or greater than a threshold value.

3. The oil condition estimation device according to claim 2, wherein the estimation unit estimates that the oil has deteriorated in a case where the density difference is equal to or greater than the threshold value and the first density is less than the second density.

4. The oil condition estimation device according to claim 2, wherein the estimation unit estimates that the oil has been diluted by fuel injected into the internal combustion engine in a case where the density difference is equal to or greater than the threshold value and the first density is greater than the second density.

5. The oil condition estimation device according to claim 2, wherein the greater the distance a moving body equipped with the internal combustion engine travels after the oil stored in the oil pan was replaced, the more the estimation unit reduces the threshold value.

6. The oil condition estimation device according to claim 2, wherein the calculation unit calculates the first density by detecting a replacement of the oil stored in the oil pan.

7. The oil condition estimation device according to claim 2, wherein the calculation unit calculates, as the second density, a statistical quantity of a plurality of the second densities calculated for each predetermined first cycle in a second cycle which is longer than the first cycle.

8. The oil condition estimation device according to claim 2, wherein the calculation unit calculates at least one of the first density or the second density within a time period from a timing at which an operation of starting the internal combustion engine is received until a timing immediately before the internal combustion engine starts.

9. The oil condition estimation device according to claim 2, further comprising:
- a notification unit that notifies a user of the internal combustion engine that the estimation unit has estimated that the condition of the oil is abnormal.

10. The oil condition estimation device according to claim 9, wherein the notification unit causes a display device to display a first warning image when the estimation unit estimates that the oil has deteriorated, and causes the display device to display a second warning image when the estimation unit estimates that the oil has been diluted.

11. The oil condition estimation device according to claim 1, wherein the calculation unit calculates a weight of the oil on the basis of the pressure of the oil and a cross-sectional area of the oil pan corresponding to a position of the liquid level of the oil, and the oil condition estimation device further comprises an estimation unit that estimates that a malfunction has occurred in the internal combustion engine when a subtraction value obtained by subtracting a second weight of the oil, calculated by the calculation unit at a second time that is later than a first time, from a first weight of the oil, calculated by the calculation unit at the first time, is equal to or greater than a threshold value.

12. The oil condition estimation device according to claim 11, wherein the calculation unit calculates the weight of the oil within a time period from a timing at which a predetermined time has elapsed after the internal combustion engine stops until a timing immediately before the internal combustion engine starts.

13. The oil condition estimation device according to claim 11, further comprising:
- a notification unit that notifies a user of the internal combustion engine that the estimation unit has estimated that a malfunction has occurred in the internal combustion engine.

14. An oil condition estimation method executed by a processor comprising:
- a first acquiring step of acquiring a pressure of oil stored in an oil pan from a pressure sensor provided on a bottom surface of the oil pan of the internal combustion engine;
- a second acquiring step of acquiring a distance between the bottom surface and a liquid level of the oil, from a level sensor provided in the oil pan; and
- a calculating step of calculating a density of the oil on the basis of the pressure and the distance.

* * * * *